May 1, 1934.  H. K. MILNER  1,956,650
LOADING AND TOPPING MACHINE FOR COTTON AND THE LIKE
Filed Nov. 27, 1931  4 Sheets-Sheet 4
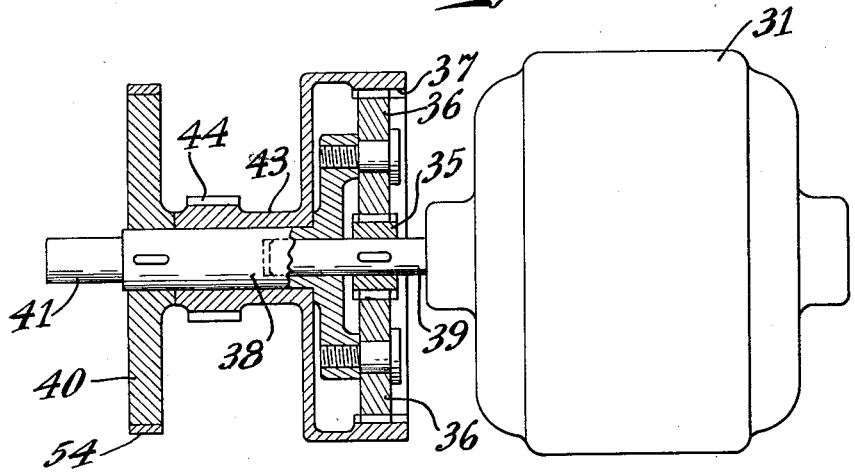
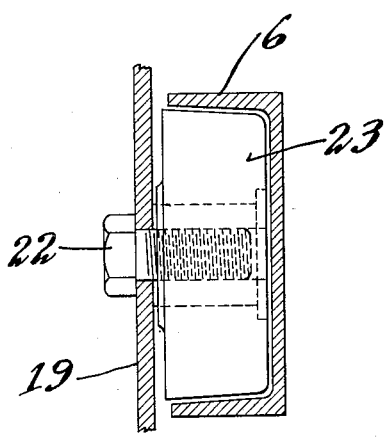
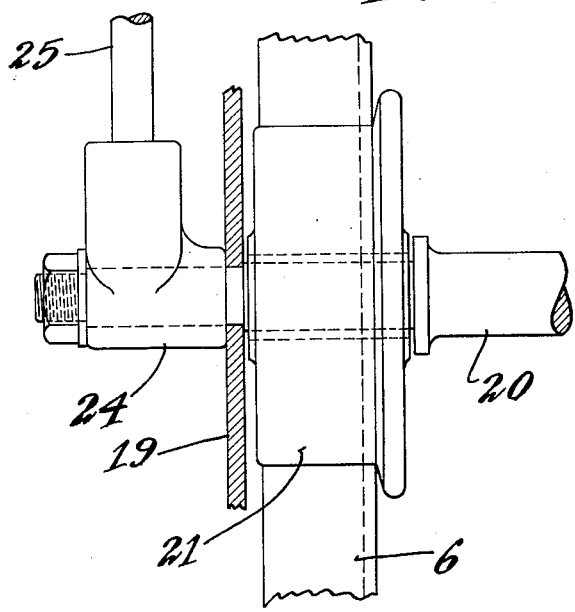
INVENTOR
H. K. Milner
BY
ATTORNEYS Patented May 1, 1934

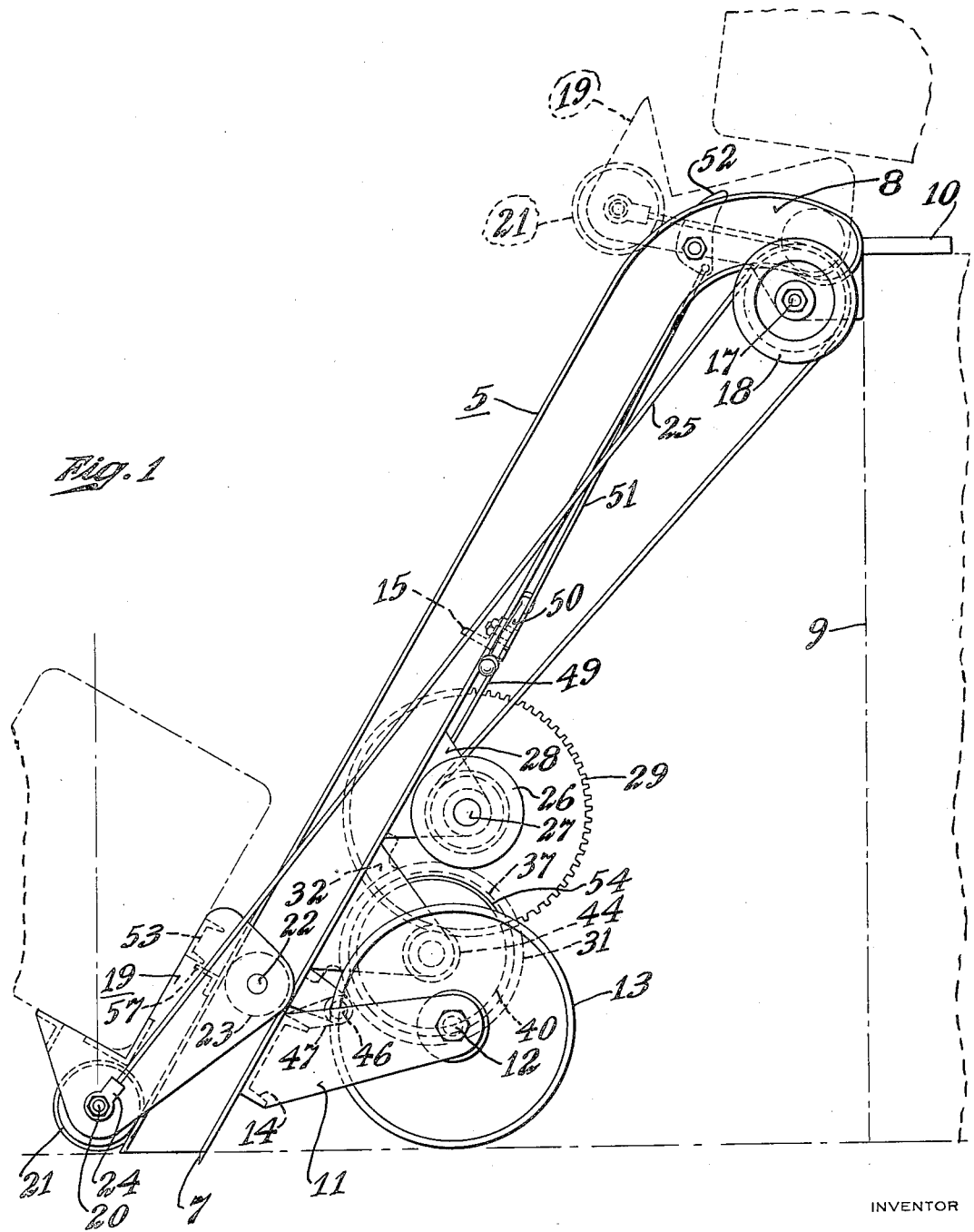

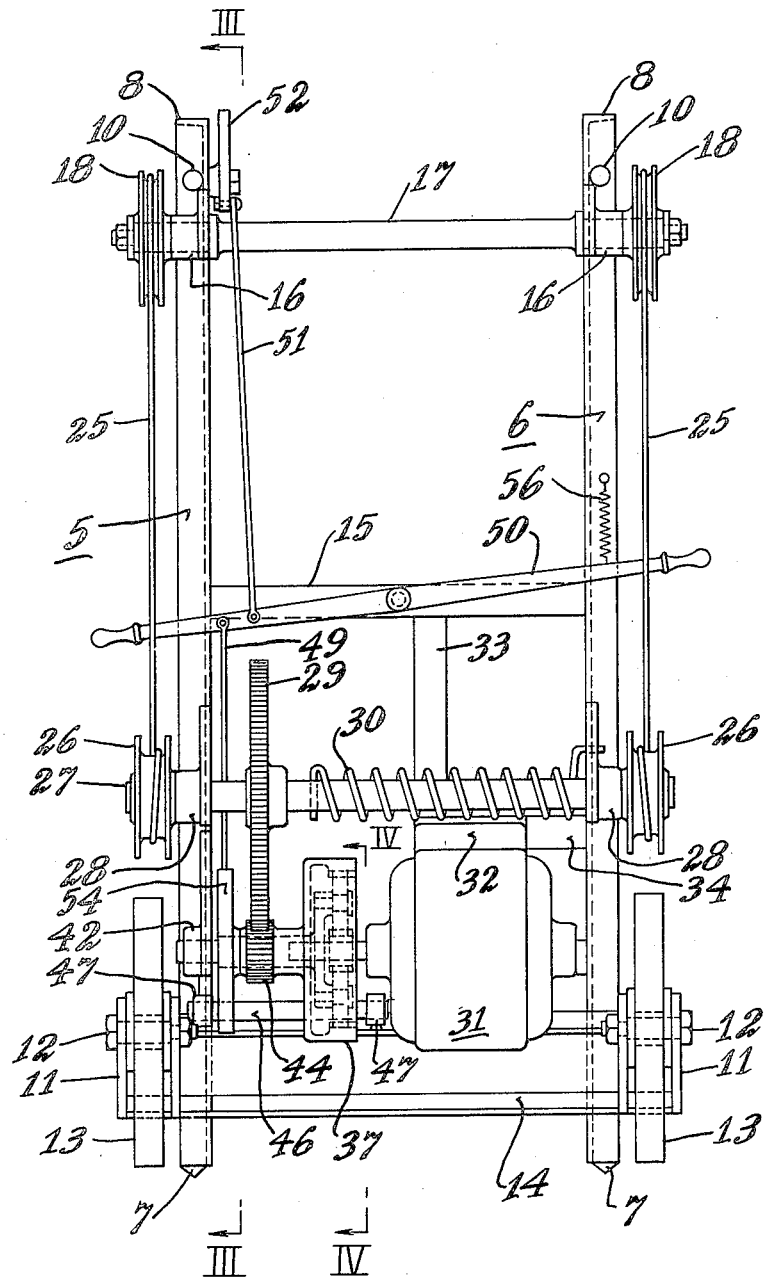

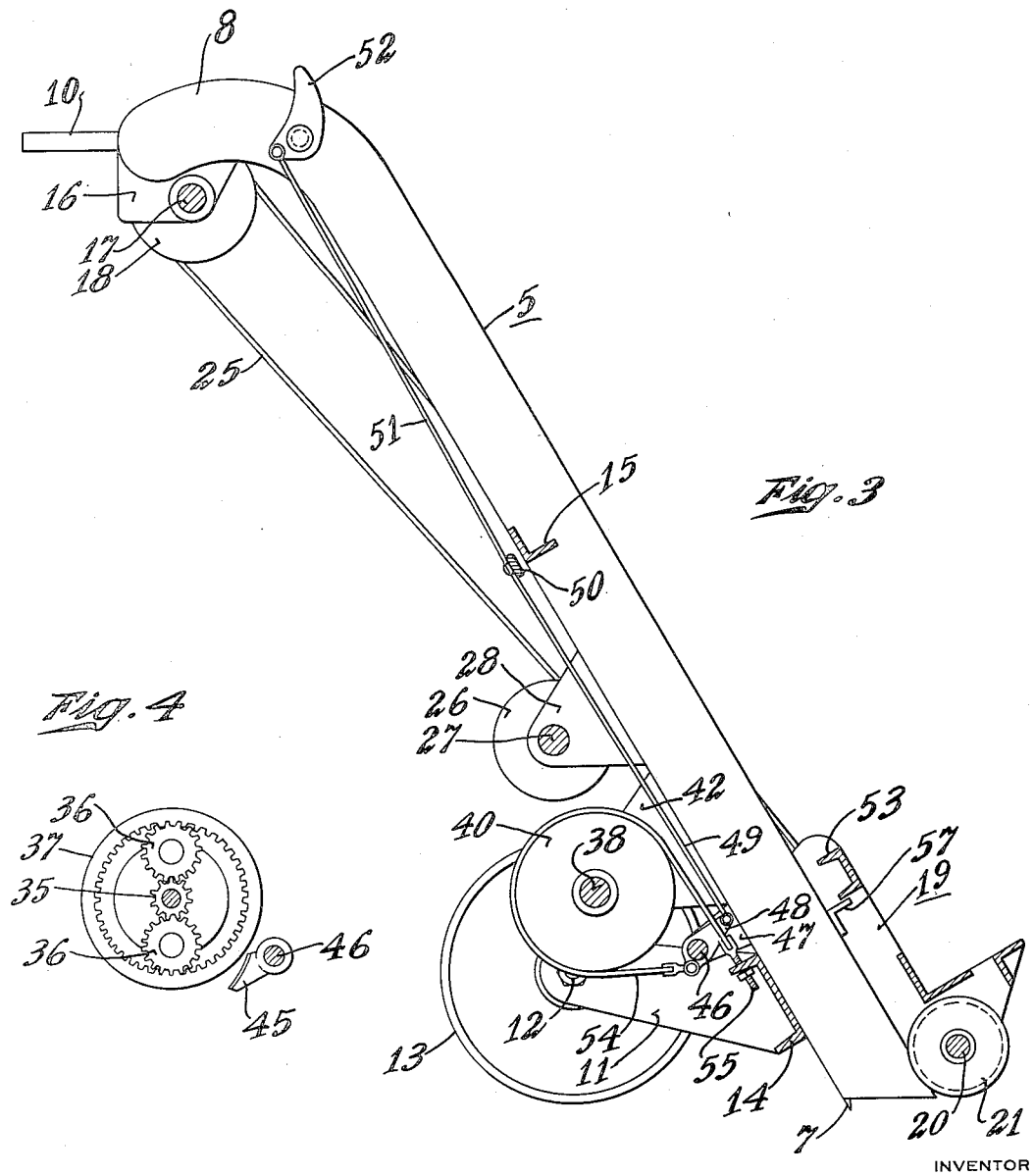

1,956,650

UNITED STATES PATENT OFFICE 1,956,650

LOADING AND TOPPING MACHINE FOR COTTON AND THE LIKE

Henry Key Milner, Birmingham, Ala.

Application November 27, 1931, Serial No. 577,546

10 Claims. (Cl. 214—103)

My invention relates to a light and portable type of power operated loading and topping machine for cotton bales and packaged goods which can be readily moved about by one man and which is adapted both for the piling of cotton bales and the like in warehouses or for topping cotton and like bales or packages in railway cars.

There has been a need for a light, comparatively inexpensive, power operated machine of this type which could be readily moved about the warehouse and into the railway cars and which when placed in position would act to receive and rapidly lift and deposit bales of cotton and the like upon other bales so as to stack same or to top a railway car, i. e., to put the bales on top of other bales which, standing on end, substantially cover the bottom of the car. I have conceived that this need can be supplied by the provision of a frame having its center of gravity forward of its supporting wheels so that it will stand upright, and which is equipped with a power operated hoist which in its lowered position will receive a bale presented to it for loading and will hoist the bale and deposit it on top of other bales against which the machine rests and by which it is supported in its operating position.

My invention further contemplates equipping the frame with floor engaging spuds or points which will be driven into the floor by the weight of the cotton bale or other articles deposited on the machine and which, due to the unbalanced condition of the machine, will prevent it skidding or slipping while hoisting and discharging the bale.

My invention further contemplates designing the hoist carriage so that its main load supporting wheels stand substantially in line with the center of the load on the carriage, the carriage having guide wheels which work in channels of the frame to hold it against tilting without being called on to carry any major part of the load of the carriage which is carried by the main flanged wheels which travel on the flat upper flange of the channels.

My invention further contemplates attaching the cables of the hoist for the carriage to the axle carrying its load supporting wheels, thereby to most effectively transmit the pull of the hoist mechanism to the carriage and adapt the pull to work against the load and thus ease the burden on the wheels.

My invention further contemplates the provision of novel means for the control of the motor operating hoist, for braking the hoist so as to prevent its getting out of control, and for the operation of the control from either side of the truck.

My invention further contemplates the equipment of the machine with a constantly driven motor, preferably an electric motor, with a clutch control, operable both by hand and automatically, to start and stop the bale elevating carriage.

My invention further contemplates transmitting power from the constantly driven motor to the hoist through an epicyclic gearing comprising a sun gear and a sleeve carrying planetary gears, there being frictional brakes oppositely applicable to the sleeve and the ring gear to the bind one when the other is released and vice versa.

My invention further contemplates utilizing spring-pressed means to automatically apply the brake to the ring gear which is adapted to act with a powerful effect should the hoist mechanism release while the carriage is being lifted.

My invention further contemplates equipping the machine with a drum and cable operated hoist having associated therewith a coiled spring which is placed under tension as the bale elevating carriage is lifted and which will thus act automatically to return this apparatus to lowered position independently of the motor drive.

My invention further comprises the novel details of construction and arrangements of parts, which in their preferred embodiment only are illustrated in the accompanying drawings, forming a part of this application, and in which:—

Fig. 1 is a side elevation of my invention shown in operative position with the hoist in dotted position assumed at the time of discharging the bale therefrom;

Fig. 2 is a rear view of Fig. 1, omitting the carriage;

Figs. 3 and 4 are cross sectional views taken on the lines III—III and IV—IV respectively of Fig. 2;

Fig. 5 is a detail view of the motor, showing the driving pinion and clutch disk in section;

Fig. 6 is a detail cross sectional view taken through one of the side channels and showing the carriage wheels working therein in elevation; and Fig. 7 is a detail view showing one of the load bearing flanged carriage wheels and illustrating the manner of attachment of the hoist cables to the carriage.

Similar reference numerals refer to similar parts throughout the drawings.

In the embodiment of my invention illustrated, I show a machine for piling and topping cotton bales and the like which comprises a frame having side members 5 and 6 formed by outturned channels, their lower ends being beveled to rest on the floor and having spuds 7 which penetrate the floor to prevent slippage. The channels are inclined and have curved upper ends 8 which will terminate approximately at the top level at a lower row of up-ended cotton bales 9. Handles 10, welded or otherwise secured to the channels, extend rearwardly from the ends 8 and are disposed so as to take a flat bearing on the upper ends of the bales 9.

The frame is provided with elongated rearwardly extended bearing brackets 11 near its lower end in which is journaled a cross shaft 12 upon which supporting wheels 13 are mounted, for use in transporting the frame. The brackets 11 are carried by a cross channel 14 which is attached to the bottom flanges of the frame sides 5 and 6 and serves to rigidly cross brace them at their lower ends. These sides are also cross braced by an intermediate angle 15 and at their upper ends 8 by the shaft 17 journaled in depending bearing brackets 16 and having overhung ends on each side to receive the grooved hoist cable pulleys 18.

The mechanism as thus far described has its center of gravity forward of the axis of the wheels 13 so that the frame will stand in upright position as shown in Fig. 1 in which it is anchored by its spuds 7, and when in this position it has the proper height for its handles 10 to take a bearing on top of the lower tier of bales.

The bale elevating carriage comprises a structural iron frame 19 having journaled therein at its lower end a cross shaft 20, on the ends of which are mounted the lower pair of load bearing wheels 21 that are flanged and adapted to ride upon the flat upper flanges of the side channels 5 and 6 as tracks.

Near the upper end of the carriage its sides carry inwardly directed bearings mounted on the screws 22 and on each of these bearings is journaled a slightly tapered wheel 23 which is received in the adjacent channel and conforms to the inner surfaces of the channel flanges. The outer ends of the shaft 20 have mounted on them sleeves 24 each bearing a socket in which a hoist cable 25 is securely fastened. Each cable passes up about the adjacent drum 18 and thence downwardly to its respective drum 26 to which its other end is made fast. These drums 26 are fast on the ends of a cross shaft 27, journaled in the bearing brackets 28 which depend from the frame sides. Also fast on shaft 27 within the frame is a sprocket gear 29 and a coiled spring 30, wound about this shaft has one end secured thereto, its other end being secured to a bracket 28. The spring is so wound that it is placed under tension as the pulleys 26 take up on the cables 25 and raise the carriage.

Below the shaft 27 is mounted a motor 31, preferably an electric motor, having its base 32 secured to a bracket comprising the longitudinal plate 33 connected to the cross members 14 and 15 and having a cross member 34 braced to the adjacent channel member 6.

The motor drives a small pinion 35 which meshes a pair of planetary gears 36 that in turn mesh the ring gear 37. The gears 36 are journaled on arms on the shaft 38 which at one end is recessed to receive the motor shaft 39 upon which the sun gear 35 is mounted. The shaft 38 has a brake drum 40 keyed thereon and its outer end 41 is reduced and mounted in a bearing 42 on the channel member 5. The ring gear 37 is rigid with a sleeve 43 which turns on shaft 38 and extends to the brake drum, and adjacent thereto is formed with the gear teeth 44 which mesh the pinion 29.

The outer periphery of the ring gear 37 coacts with a braking element 45 (Fig. 4) which is fast on a cross shaft 46, mounted in brackets 47, one of which is secured on the cross channel 14 and the other is secured on the channel member 5.

Fast on the shaft 46 is a crank arm 48 (Fig. 3) which has connected thereto an operating rod 49 leading to the pivoted hand lever 50 which is mounted on the cross member 15 and has handle ends projecting into position to be operated from both sides of the machine. Connected to this handle is a second rod 51 which extends up to a pivoted trip 52 mounted near the top 8 of the channel member 5 and disposed in position to be engaged by the carriage and actuated when the latter reaches or approaches its uppermost position on the frame ends 8.

A cross channel 53 on the carriage is disposed to engage and actuate the trip 52 and thereby rock the shaft 46 so as to apply the brake member 45 and at the same time to release a brake band 54 which is connected at one end on the crank 48 on the opposite side of the shaft 46 from the crank connection to the rod 49. The band after circling the brake drum 40 is adjustably connected by the adjusting bolt 55 to the top flange of the cross channel 14. Thus, the motion imparted to shaft 46 either by hand lever 50 or trip 52 will serve either to apply the brake band to brake drum 40 and simultaneously to release the brake element 45 from engagement with the ring gear 37, or it will act simultaneously to hold the ring gear 37 and release the brake drum 40.

Assuming the apparatus has been assembled in the manner described, it can be readily transported on its wheels 13 to the point of use where it is tilted forward and responsive to its center of gravity being forward of the wheel axis it will stand upright with its handles 10 in position to rest upon the lower tier of bales and its spuds 7 embedded in the floor. The motor is thereupon started and runs continuously during the loading operation which proceeds as follows.

Assuming the carriage 19 in the loading position as in Fig. 1, the bale to be stacked or topped is deposited on the carriage, whereupon the operator grasps the lever 50 and so manipulates it as to grip the brake drum 40 and release the gear 37. Thereupon the gear 35, which is turning constantly with the motor, will act through the gears 36, the axes of which are held stationary, to turn the ring gear and through it to drive gear 44 and pinion 29, thereby turning shaft 37 so as to wind the hoist cables 25 on the drums 26 and to wind up the spring 30. This lifts the carriage 19 with a quick powerful movement, its wheels 21 riding on the top of the channels and its wheels 23 riding between the channel flanges. When the carriage reaches the top 8 it automatically actuates the trip 52 which shifts the lever 50 so as to release the brake drum 40 and hold the ring gear 37 by brake 45. This releases the shaft 38, permits epicyclic movement of the gears 36 and thus stops the drive to the carriage and lets it come to rest in dotted position (Fig. 1) with sufficient momentum to effect the discharge therefrom of the bale to be stacked or topped.

Upon easing up on the brake element 45 holding the ring gear 37, the gear 44 is released so that the spring 30 is free to reverse the rotation of train of gears 37, 44 and 29 and to unwind the cable, which will allow the carriage to descend rapidly with a gravitating movement to its lowered position, this descent being controlled by the manually controlled braking action of 45 on the ring gear 37.

The spring 56 acts on arm 50 whenever it is released, to apply brake 45 and release the brake band to disconnect the motor drive to the carriage cable pulleys. This will stop and hold the carriage in any position it may be in when the manual control is released by accident or otherwise. Lugs 57 engage carriage channel 53 to stop same.

The apparatus is capable of rapid manipulation in skilled hands and in view of the fact that the motor is constantly turning at high speed the carriage can be clutched and unclutched therefrom so as to effect its hoisting movements easily and rapidly, and with little power, as the motor does not have to be stopped and started and its rotor will act as a fly wheel.

The dotted line in Fig. 1 indicates that the center of gravity of the bale on the carriage is over the axle 20 to which the hoist cables connect. This requires only a load balancing duty of the wheels 23 and keeps the load bearing burden on wheels 21.

While I have shown my invention in but one form, it will be obvious to those skilled in the art that it is not so limited, but is susceptible of various changes and modifications, without departing from the spirit thereof, and I desire, therefore, that only such limitations shall be placed thereupon as are imposed by the prior art or as are specifically set forth in the appended claims.

What I claim is:—

1. An apparatus of the character described, comprising a hand truck frame providing a hoist, a carriage movable up and down on said hoist, an operative means mounted on said frame for raising and lowering the carriage comprising a motor, a drive therefrom to raise and lower the carriage comprising an epicyclic gearing having its sun gear constantly driven in one direction by said motor, an intermittently driven ring gear operably connected to the carriage, a planetary transmission gear having a brake controlling its revolution about the sun gear, a brake operable to control the ring gear, and means adapted to cause the alternate engagement of the planetary transmission gear brake and the ring gear brake.

2. An apparatus of the character described, comprising a hand truck frame providing a hoist, a carriage movable up and down on said hoist, an operative means mounted on said frame for raising and lowering the carriage comprising a motor, a drive therefrom to raise and lower the carriage comprising an epicyclic gearing having its sun gear constantly driven in one direction by said motor, an intermittently driven ring gear operably connected to the carriage, and a planetary transmission gear having a brake controlling its revolution about the sun gear, a brake operable to control the ring gear, carriage controlled means to release the planetary gear brake automatically, and means adapted to cause the alternate engagement of the planetary transmission brake and the ring gear brake.

3. An apparatus of the character described, comprising a portable frame providing a hoist, a carriage movable up and down on said hoist, an operative means for raising and lowering the carriage comprising a motor mounted on said frame, a drive therefrom to raise and lower the carriage comprising an epicyclic gearing having its sun gear constantly driven in one direction by said motor, an intermittently driven ring gear operably connected to the carriage, and a planetary transmission gear having a brake controlling its revolution about the sun gear, a brake operable to control the ring gear when the first mentioned brake is released, and carriage controlled means to release the planetary gear brake automatically and simultaneously apply the ring gear brake.

4. An apparatus of the character described, comprising a hand truck frame for top loading, a carriage vertically reciprocable on the frame, hoist cables for the carriage, a motor drive on the truck for said cables, a laterally extended hand lever clutch and brake means for said motor drive controlled by said lever, and a spring adapted automatically upon release of the lever to unclutch the motor and apply the brake to hold the carriage.

5. A power loader comprising a hand truck body having wheel supports, a hoist carriage reciprocable on said body, an electric motor mounted on the said body and adapted to drive a sun gear, a sleeve carrying a brake drum and planetary gears meshing said sun gear, a ring gear meshing the planetary gears and serving as a brake drum, reversely operable brake elements each coacting with one of said drums, and combined manual and hoist carriage controlled automatic means to apply one of said brake elements as the other is released.

6. A power loader according to claim 5, in which both brake operating elements are mounted on a common shaft journaled on the body and having a crank arm to which the manual and automatic brake operating means are connected.

7. In a hand truck, a frame having wheels and bearings therefor offset rearwardly to bring the center of gravity of the truck forward of the wheel axis, a carriage provided with wheels for movement along said frame, a cable drum secured to the frame for raising the carriage, a motor mounted on the rear of the frame and forward of the wheel axis when the truck stands upright, a sun gear secured to the motor shaft, a planetary gear sleeve mounted for rotation on said motor shaft, a brake drum secured to said sleeve, planetary gears journaled on said sleeve for engagement with the sun gear, a ring gear sleeve mounted for rotation on the planetary gear sleeve, a ring gear provided on the ring gear sleeve for engagement with the planetary gears, a gear provided on the ring gear sleeve adapted to rotate the cable drum, means provided for engagement with the brake drum to cause the motor to raise the carriage, and brake means coacting with the ring gear sleeve for holding and lowering the carriage to its starting position.

8. A loading apparatus of a portable type, comprising a frame having an inclined way, a loading carriage guided to travel on said way and adapted to be tilted thereby at its upper end of the way to discharge its load by its momentum over the top of the frame, a motor driven hoist means mounted on the frame for operating said carriage, and spring means adapted to assist the gravitational return of the carriage to loading position.

9. An apparatus of the character described, comprising a wheeled truck frame providing an inclined way tipped over at its top, a carriage reciprocable on said way, a motor driven cable hoist for elevating the carriage comprising a drum shaft, a coil spring operably connected with the drum shaft and adapted to be tightened as the shaft rotates the hoist to elevate the carriage and to unwind the drum shaft to permit a freer gravitational return of the carriage down said way, and means to check the descent of the carriage.

10. A portable hand truck comprising a wheeled frame and a carriage reciprocable on said frame, a motor driven hoist means on the frame comprising a drum shaft and cables passing therefrom about idler wheels to the carriage for elevating it, a coil spring surrounding the drum shaft and adapted to be wound up and tightened thereby as the carriage is raised, said spring acting to reverse the cable hoist drive and leave the carriage free for a gravitational return, and means to check and stop the descending carriage.

HENRY KEY MILNER.